(12) United States Patent
Paterour et al.

(10) Patent No.: US 11,936,728 B2
(45) Date of Patent: Mar. 19, 2024

(54) METHOD FOR THE FILE DISTRIBUTION BETWEEN INTERCONNECTED 3GPP MCDATA SYSTEMS

(71) Applicant: AIRBUS DS SLC, Elancourt (FR)

(72) Inventors: Olivier Paterour, Elancourt (FR); François Piroard, Elancourt (FR)

(73) Assignee: AIRBUS DS SLC, Elancourt (FR)

( * ) Notice: Subject to any disclaimer, the term of this patent is extended or adjusted under 35 U.S.C. 154(b) by 0 days.

(21) Appl. No.: 18/296,196

(22) Filed: Apr. 5, 2023

(65) Prior Publication Data

US 2023/0328135 A1 Oct. 12, 2023

(30) Foreign Application Priority Data

Apr. 7, 2022 (FR) ...................................... 2203169

(51) Int. Cl.
*H04L 67/1095* (2022.01)
*H04L 67/06* (2022.01)

(52) U.S. Cl.
CPC .......... *H04L 67/1095* (2013.01); *H04L 67/06* (2013.01)

(58) Field of Classification Search
CPC . H04L 67/1095; H04L 67/06; H04L 12/4633; G06F 21/606
See application file for complete search history.

(56) References Cited

U.S. PATENT DOCUMENTS

| | | | |
|---|---|---|---|
| 6,415,329 B1* | 7/2002 | Gelman | H04L 69/163 709/245 |
| 7,337,224 B1* | 2/2008 | Van Horne, III | H04L 61/5014 709/224 |
| 2012/0059934 A1* | 3/2012 | Rafiq | H04L 67/1008 709/225 |
| 2014/0258441 A1* | 9/2014 | L'Heureux | H04L 12/66 709/217 |

FOREIGN PATENT DOCUMENTS

WO   WO 2022/013190 A1   1/2022

OTHER PUBLICATIONS

Search Report as issued in French Patent Application No. FR2203169, dated Dec. 19, 2022.

(Continued)

*Primary Examiner* — Michael Won
(74) *Attorney, Agent, or Firm* — Pillsbury Winthrop Shaw Pittman LLP

(57) ABSTRACT

A method for distributing a file in a network according to the 3GPP standard includes transmitting, by the first client entity, a file distribution request including the first address, modifying, by the gateway, in the file distribution request, the first address to a second address, transmitting the file distribution request including the second address to the second content server, modifying, by the second content server, the second address in the request to a third address, transmitting the request including the third address to the second client entity, transmitting, by the second client entity, a request to download the file comprising the third address (Continued)

to the content server, receiving, by the second client entity, the file, and storing, by some entities, correspondences between the addresses.

12 Claims, 11 Drawing Sheets

(56) References Cited

OTHER PUBLICATIONS

"3rd Generation Partnership Project; Technical Specification Group Services and System Aspects; Functional architecture and information flows to support Mission Critical Data (MCData); Stage 2 (Release 17)," 3GPP Standard; Technical Specification; 3GPP TS 23.282, 3rd Generation Partnership Project (3GPP), vol. SA WG6, No. V17.5.0, Dec. 2020, Retrieved from the Internet: URL:https://ftp.3gpp.org/Specs/archive/23_series/23.282/23282-h50.zip23282-h50.doc [Retrieved on Dec. 19, 2020], XP051975162, pp. 1-223.

* cited by examiner

METHOD FOR THE FILE DISTRIBUTION BETWEEN INTERCONNECTED 3GPP MCDATA SYSTEMS

CROSS-REFERENCE TO RELATED APPLICATIONS

This application claims priority to French Patent Application No. 2203169, filed Apr. 7, 2022, the entire content of which is incorporated herein by reference in its entirety.

FIELD

The technical field of the invention is that of telecommunications.

The present invention relates to a method for distributing files between interconnected 3GPP MCData systems, and in particular for managing access to a file stored within a system by an external system while limiting the security risks, as well as a method for deleting such a file.

BACKGROUND

The PMR (Professional Mobile Radio) radiocommunication standards TETRAPOL®, TETRA® or P25® allow the implementation of secure professional networks. These narrowband networks are national or local area networks: they are implemented for example within an organisation such as a company, within a country for example for the communications of firemen, police forces, the military etc.

These networks are evolving to support broadband exchanges. The 3GPP standard governing mobile networks of the "GSM" (Global System for Mobile Communications) type, and more particularly in deployments resorting to critical communications services defined by the 3GPP, called "MCS" (Mission Critical Services), allows for these secure broadband exchanges.

By "communication network according to the 3GPP MCS standard", it is meant a communication network that is compatible with the 3GPP MCS standard, and more particularly with the current version of 3GPP, which is version 17, with previous versions from version 13 onwards, and with subsequent versions incorporating all the characteristics of the invention.

In the 3GPP MCS standard, the following communication services are defined:
- MCPTT (Mission Critical Push To Talk), which allows for voice communications,
- MCVideo, which allows for video communications,
- MCData, which comprises three sub-services:
  - SDS (Short Data Service) and
  - FD (File Distribution),
  - IPCon (IP Connectivity).

For example, a network R for implementing a file distribution FD of the MCData service is represented in FIG. 1. This network R is distributed over several interconnected systems A and B. System A comprises an MCData client C1 connected to a so-called MCData content server SC1 according to the 3GPP MCS. The content server SC1 can communicate with other servers in the network R. In FIG. 1, the content server SC1 can communicate with a 3GPP MCS server S1. Such a server S1 comprises a file distribution function FD, in collaboration with the file content server SC1. This is represented in FIG. 2, which shows exchanges included in a known file distribution method 1a in the network R of FIG. 1. The method 1a is also represented in FIG. 3. This method is described in 3GPP TS 23.282 technical specification (MCData Stage 2) Revision 17 Section 7.5.2.4.3. This method requires the implementation of a service agreement between both interconnected systems A and B, in particular to share MCData information such as messages or files. This method uses the HTTP protocol (Hypertext Transfer Protocol).

In a step 11, the client C1 uploads its file F to the content server SC1, as described in 3GPP TS 23.282 technical specification (MCData Stage 2) Revision 17 Section 7.5.2.2. The file F is then assigned a Uniform Resource Locator (URL) address URL1 address by the content server SC1. The URL1 address locates the file F and allows a client or server of the network R or of an external network to identify the file F and thus to access the file F stored by the content server SC1.

In a step 12, the client C1 sends a file distribution request MCData, called "MCData FD Request". Such a request includes the URL1 address of the file F and is intended for:
- a client C2 of the network R, for file sharing between two MCData clients,
- a plurality of clients belonging to an MCData group of the network R for file sharing in the MCData group.

This request informs the destination clients that a file F is available at the URL1 address on the content server SC1 of the network R. In the case represented in FIG. 2, the client C2, belonging to the system B interconnected with the system A, is the destination of the request sent in step 12. Step 12 comprises several sub-steps of transmitting this request, first sent by the client C1 to the server S1. The server S1 receiving this request performs a sub-step Aut of verifying that the client C1 actually has the authorisation to send the request, and of verifying with the content server SC1 that the file F is still available at the URL1 address included in the request, this sub-step being represented by dotted arrows of different sizes. If the file is no longer available, the request 12 is not transmitted and the method is stopped. If the file F is still available, after verifying authorisation and availability of the file F, the request is sent from the server S1 to a server S2 included in the system B interconnected with the system A, as the system B includes the destination client C2. The server S2 is a 3GPP MCS server implementing a file distribution FD function. The request is transmitted, in step 12, via the gateway GW1 belonging to system A and via the gateway GW2 belonging to system B.

The server S2 receives the request and verifies which users have the possibility to receive a file and which users are authorised to receive the file F. The file F is then transmitted to the client C2, which is used by a user authorised to receive the file F. The client C2 receiving the request may inform its user of the availability of the file F, for example via an alert AI, for example via a screen of the client C2.

The client C2 then sends a response at a step 13, transmitted by the server S2 to the server S1 via the gateways GW1 and GW2, and then by the server S1 to the client C1. This response is a protocol acknowledgement, without user intervention, that the message is safely received by the client C2.

The client C2 then sends a request to download the file F in a step 14. This request is sent to the content server SC2. The content server SC2 receiving the request verifies whether the file is stored locally and, if not, sends a file F retrieval request to the content server SC1. The file F download request includes the URL1 address of the location of the file in the system A.

The file F is then transmitted from the content server SC1 to the content server SC2 and then to the client C2, as represented in dotted line. The content server SC2 of the interconnected system B can then also store the file F.

In a step 15, the client C2 provides the client C1 with a report on the completion of downloading the file F, if requested by the user of the client C1 in the initial request of step 12.

The download completion report of the file F is sent to the server S1 by the server S2. The server S2 may store the download completion report for query of the download history by authorised users in the system B. The received download completion report of the file F is sent by the server S1 to the client user C1. The download completion report of the file F from client C2 may be stored by the server S1 for query of the download history by authorised users in the system A.

Thus, in the method 1a represented in FIGS. 2 and 3, the URL1 address of file F transits from system A to system B and within system B.

In the same way, FIG. 4 shows exchanges included in a known method 1b of deleting the file F in the network R of FIG. 1. The method is also represented in FIG. 5. This method is described in 3GPP TS 23.282 technical specification (MCData Stage 2) Revision 17 Section 7.5.2.8.

In a first step 16, the MCData client C1 wishes to delete the file included in the content server SC1. It therefore sends an http request comprising the URL1 address. This request is received by the content server SC1, which then deletes the file located at URL1 address, that is the file F, in a step 17.

This delete request is transmitted by the content server SC1 to the content server SC2. This request also includes the URL1 address. The content server SC2 then deletes the file F if it stores it, in a step 19. The deletion method may include an alert AI to the client user C2 that the file F has been deleted. Information that the deletion is complete is then sent by the content server SC2 to the content server SC1 and then to the client C1 in a step 20.

Thus in the method 1b represented in FIGS. 4 and 5, the URL1 address of the file F also transits from system A to system B and within system B.

This is a security risk for system A when it exposes, outside of its security perimeter, internal information especially the URL1 address, or part of it, where a file to be shared is directly stored.

There is therefore a need to be able to provide a file distribution service in a 3GPP MCS network that does not have the aforementioned drawbacks.

SUMMARY

One or more aspects of the invention offer a solution to the problems previously discussed by providing, in order to distribute a file in a network according to the 3GPP MCS standard, a dynamic address modification at the gateways and content servers and a storage in memory of the different address correspondences and entities storing the file.

A first aspect of the invention relates to a method for distributing, by a first client entity, a file to at least one second client entity, in a communication network according to the 3GPP MCS (3rd Generation Partnership Program Mission-Critical System) standard, the first client entity being included in a first system further comprising a first content server and a first file distribution management server, the second client entity being included in a second system further comprising a second content server and a second file distribution management server, the first system and the second system being interconnected through a first gateway included in the first system and through a second gateway included in the second system, the file being stored by the first content server and being associated with a first address in the first system, the network being formed by at least the first system and the second system, the method comprising at least the steps of:

transmitting, by the first client entity to the first gateway, a file distribution request including the first address associated with the file in the first system, modifying, by the first gateway, in the file distribution request, the first address associated with the file in the first system, to a second address associated with the file in the first system, storing, by the first gateway, a correspondence between the first address and the second address, transmitting, by the first gateway to the second content server via the second gateway and the second file distribution management server, the file distribution request comprising the second address associated with the file in the first system, modifying, by the second file distribution management server, in the file distribution request, the second address associated with the file in the first system, to a third address associated with the file in the second system, storing, by the second file distribution management server, a correspondence between the second address and the third address, transmitting, by the second content server, the file distribution request comprising the third address to the second client entity, transmitting, by the second client entity, a request to download the file to the second content server, the request including the third address, Receiving, by the second client entity, the file.

By virtue of an aspect of the invention, the address of the file within the first system is never shared with the second system. This is beneficially achieved by the first gateway modifying the first address with a second address specific to this first gateway. Thus, the system only sees the address of the first gateway and does not get any information about the path inside the first system, nor about the composition and topology of the first system. On the other hand, the first gateway belonging to the first system stores the correspondence between both addresses, thus reversing the method and routing information to the first system from the second system.

In addition, the second content server in turn modifies the second address into a third address, thus making it possible to have, within the second system, an address dedicated to this file which is nevertheless stored in the first system. Thus, only the second gateway and the second content server have the knowledge of the address of the first gateway, and the rest of the equipment in the second system has the knowledge of the third address, dedicated to the file in the second system. This equipment thereby has no knowledge of the first system, and security is enhanced.

The invention is further divided into two embodiments described in the dependent claims.

In addition to the characteristics just discussed in the preceding paragraphs, the file distribution method according to a first aspect of the invention may have one or several additional characteristics among the following, considered individually or according to any technically possible combinations:

the file is sent from the second content server to the client entity in response to the file download request, in a first embodiment of the first aspect of the invention, the file is transmitted by the first content server to the second content server and the file is stored by the second content server prior to transmitting, by the second client entity, the request to download the file, after receiving the request to distribute the file and the file, the second content server transmits to the first gateway, via the second gateway, a response indicating that the file has been stored by the second content server, the response comprising the third address, the second gateway, upon receiving the response:
  creates a fourth address associated with the file stored by the second content server in the second system,
  modifies the third address included in the response to the fourth address created,
  stores a correspondence between the third address and the fourth address,
  transmits the response comprising the fourth address to the first gateway,
  and wherein the first gateway stores a correspondence between the second address and the fourth address and file storage information of the second content server at the fourth address.

In a second embodiment of the first aspect of the invention, the file distribution method further comprises the following steps:
  the request to download the file is transmitted, by the second client entity to the second content server, and then
  the third address included in the download request is transformed into the second address from the correspondence between the second address and the third address stored by the second management server, and then
  the request is transmitted from the second content server to the first gateway via the second gateway, and then
  the second address included in the download request is transformed into the first address from the correspondence between the first address and the second address stored by the first gateway, and then
  the request is transmitted by the first gateway to the first content server, and then
  the file is transmitted from the first content server to the second content server.

A first embodiment of a second aspect of the invention relates to a method for deleting the distributed file according to the file distribution method according to the first embodiment of the first aspect of the invention, comprising at least the steps of:
  transmitting, by the first client entity, a request to delete the file to the first content server, the request comprising the first address associated with the file within the first system,
  deleting, by the first content server SC1, the file that it stores,
  transmitting, by the first content server, the request to delete the file to the first gateway,
  converting, by the first gateway, the first address associated with the file in the first system, into the second address associated with the file in the first system, from the correspondence between the first address and the second address stored by the first gateway,
  deleting, by the first gateway, the correspondence between the first address and the second address stored by the first gateway,
  modifying, by the first gateway, in the request to delete the file, the first address associated with the file in the first system, to the fourth address associated with the file in the second system, from the file storage information by the second content server at the fourth address, the conversion step and the correspondence between the second address and the fourth address stored by the first gateway,
  transmitting, by the first gateway, the request to delete the file to the second gateway,
  modifying, by the second gateway, in the file deletion request, the fourth address to the third address, from the correspondence between the fourth address and the third address stored by the second gateway,
  deleting, by the second gateway, the correspondence between the fourth address and the third address stored by the second gateway,
  transmitting, by the second gateway, the request to delete the file to the second content server via the second management server,
  deleting, by the second management server, the correspondence between the second address and the third address stored by the second management server.

In one alternative, the method for deleting the file further comprises a step of deleting, by the second content server, the file stored by it.

A second embodiment of the second aspect of the invention relates to a method for deleting the distributed file according to the second embodiment of the first aspect of the invention comprising at least the steps of:
  transmitting, by the first client entity, a request to delete the file to the first content server, the request comprising the first address associated with the file within the first system,
  deleting, by the first content server SC1, the file that it stores,
  transmitting, by the first content server, the request to delete the file to the first gateway,
  converting, by the first gateway,
  deleting, by the first gateway, the correspondence between the first address and the second address stored by the first gateway,
  modifying, by the first gateway, in the request to delete the file, the first address associated with the file in the first system, to the second address associated with the file in the first system, from the correspondence between the first address and the second address stored by the first gateway,
  transmitting, by the first gateway to the second content server, the request to delete the file via the second gateway and the second management server,
  deleting, by the second management server, the correspondence between the second address and the third address stored by the second management server.

Another aspect of the invention relates to a communication network according to the 3GPP MCS (3rd Generation Partnership Program Mission-Critical System) standard, the communication network being formed by at least:
  a first system comprising at least a first client entity, a first content server and a first file distribution management server,
  a second system comprising at least a second client entity, a second content server and a second file distribution management server, the first system and the second system being interconnected through a first gateway included in the first system and through a second gateway included in the second system, the communication network being configured to implement the file distribution method according to the invention and the file deletion method according to one or more aspects of the invention.

According to another aspect, the invention relates to a computer program product comprising instructions that cause the network according to the invention to perform the steps of the method according to the invention and the file deletion method according to one or more aspects of the invention.

According to another aspect, the invention relates to a non-transitory computer-readable medium, on which the computer program product according to one or more aspects of the invention is recorded.

The invention and its different applications will be better understood upon reading the following description and upon examining the accompanying figures.

BRIEF DESCRIPTION OF THE FIGURES

The figures are set forth by way of indicating and in no way limiting purposes of the invention.

DETAILED DESCRIPTION

Unless otherwise specified, a same element appearing in different figures has a single reference.

Figure 6:
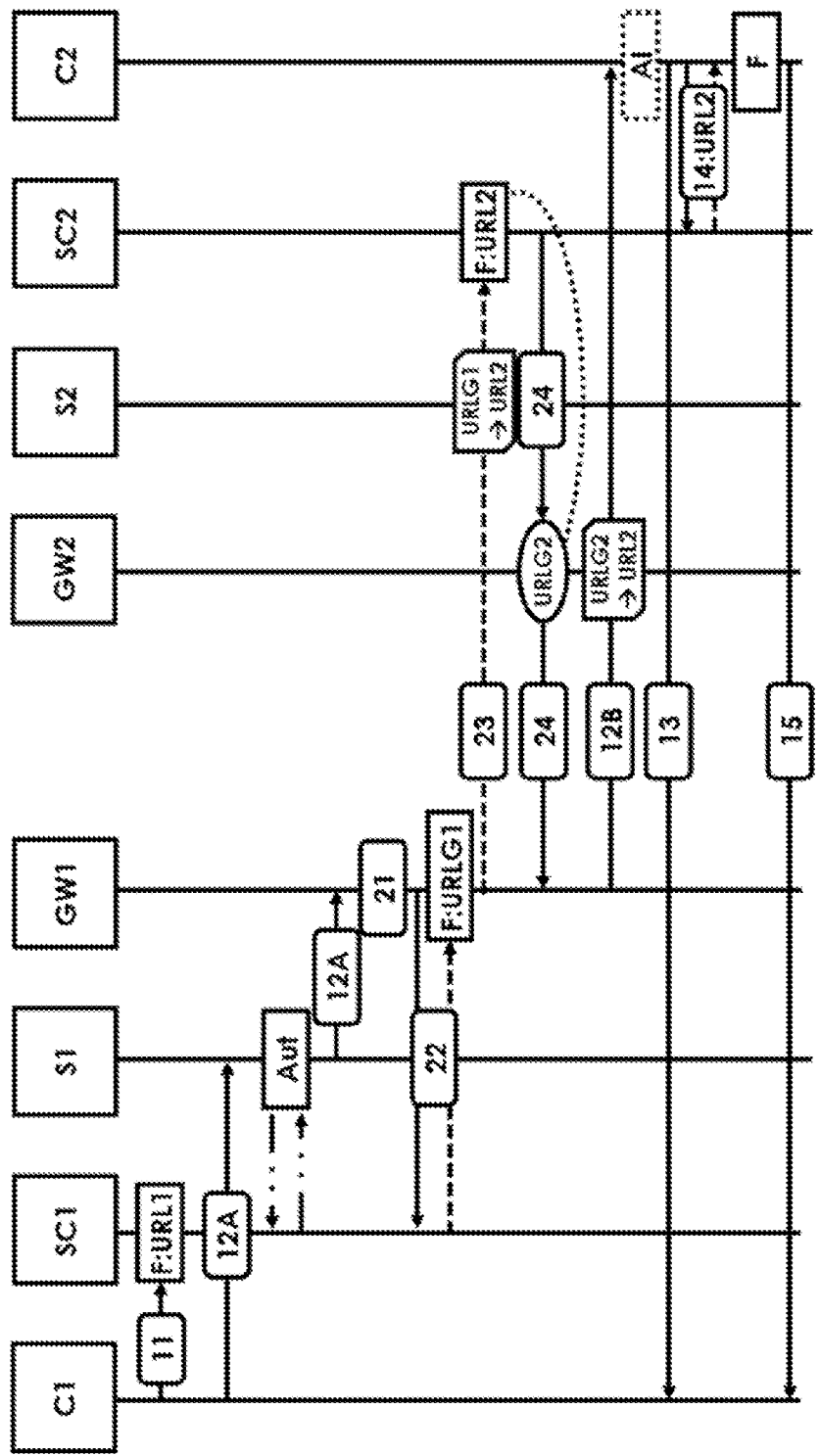
FIG. 6 shows a schematic representation of exchanges of a file distribution method according to a first embodiment of the invention within interconnected systems in the 3GPP MCS standard.
Figure 7:
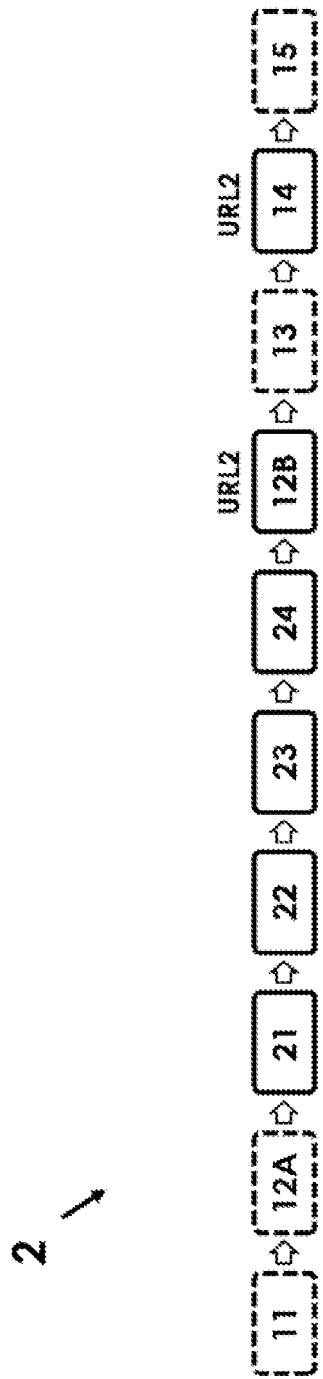
FIG. 7 shows a schematic representation of a file distribution method according to a first embodiment of the invention within interconnected systems in the 3GPP MCS standard.

FIGS. 6 and 7 both show a schematic representation of the file distribution method according to a first embodiment of the invention. FIGS. 6 and 7 show a different representation of the same method. The method according to a first embodiment of the invention is implemented by the network R represented in FIG. 1.

Figure 8:
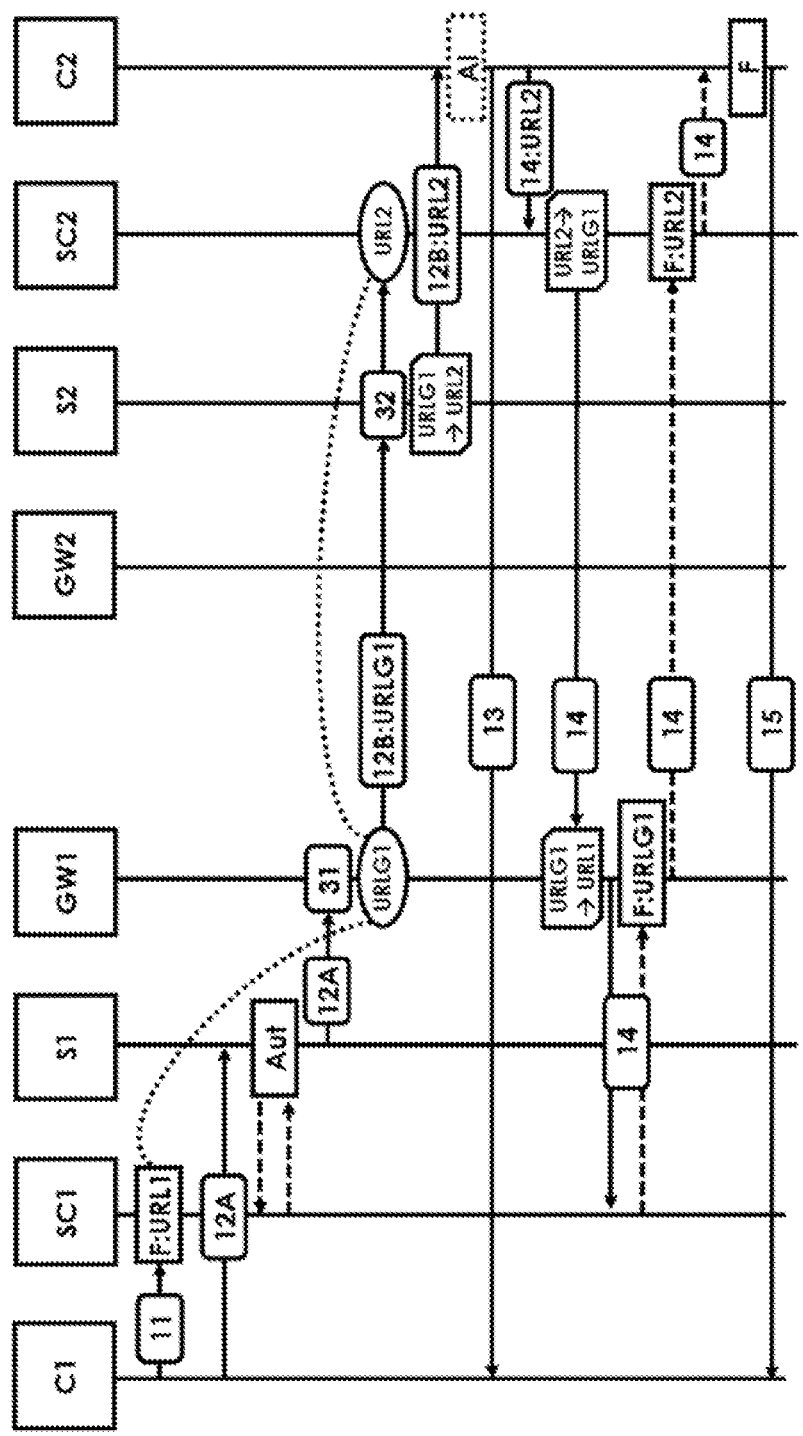
FIG. 8 shows a schematic representation of exchanges of a file distribution method according to a second embodiment of the invention within interconnected systems in the 3GPP MCS standard.
Figure 9:
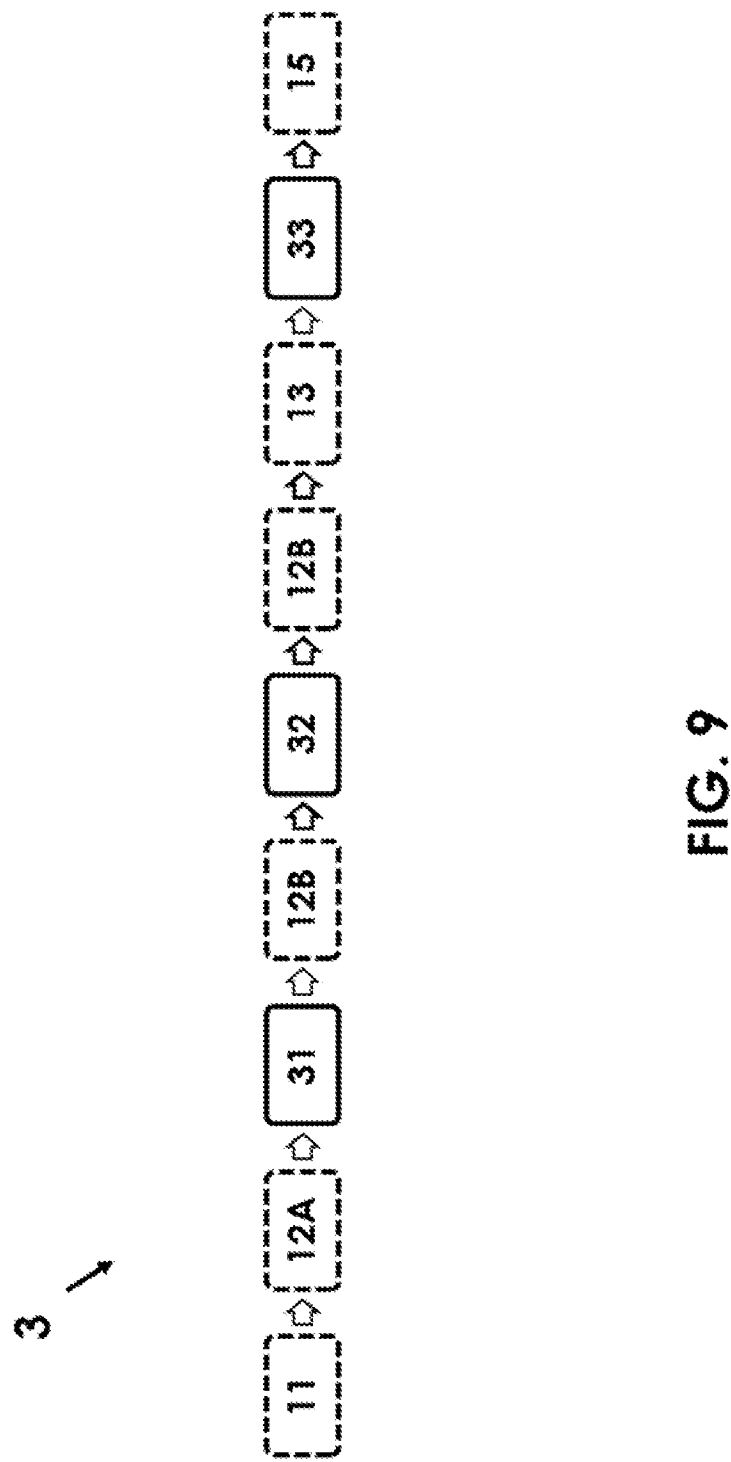
FIG. 9 shows a schematic representation of a file distribution method according to a second embodiment of the invention within interconnected systems in the 3GPP MCS standard.

FIGS. 8 and 9 both show a schematic representation of the file distribution method according to a second embodiment of the invention. FIGS. 6 and 7 show a different representation of the same method. The method according to a first embodiment of the invention is implemented by the network R represented in FIG. 1.

The method according to the invention is a method for the file distribution within interconnected systems forming a network according to the 3GPP MCS standard.

Figure 1:
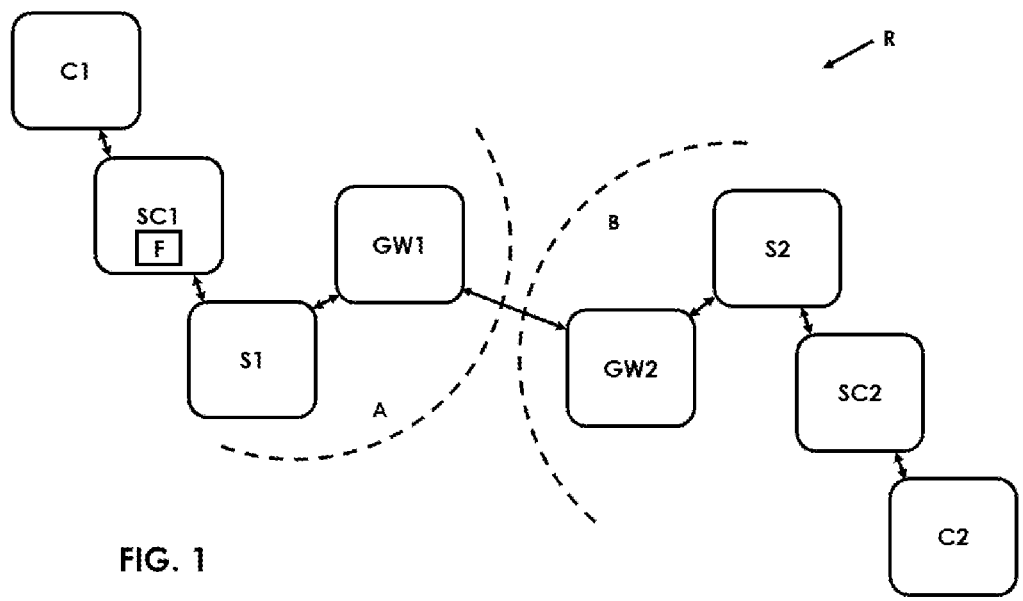
FIG. 1 shows a schematic representation of a network according to the 3GPP MCS standard.
Figure 2:
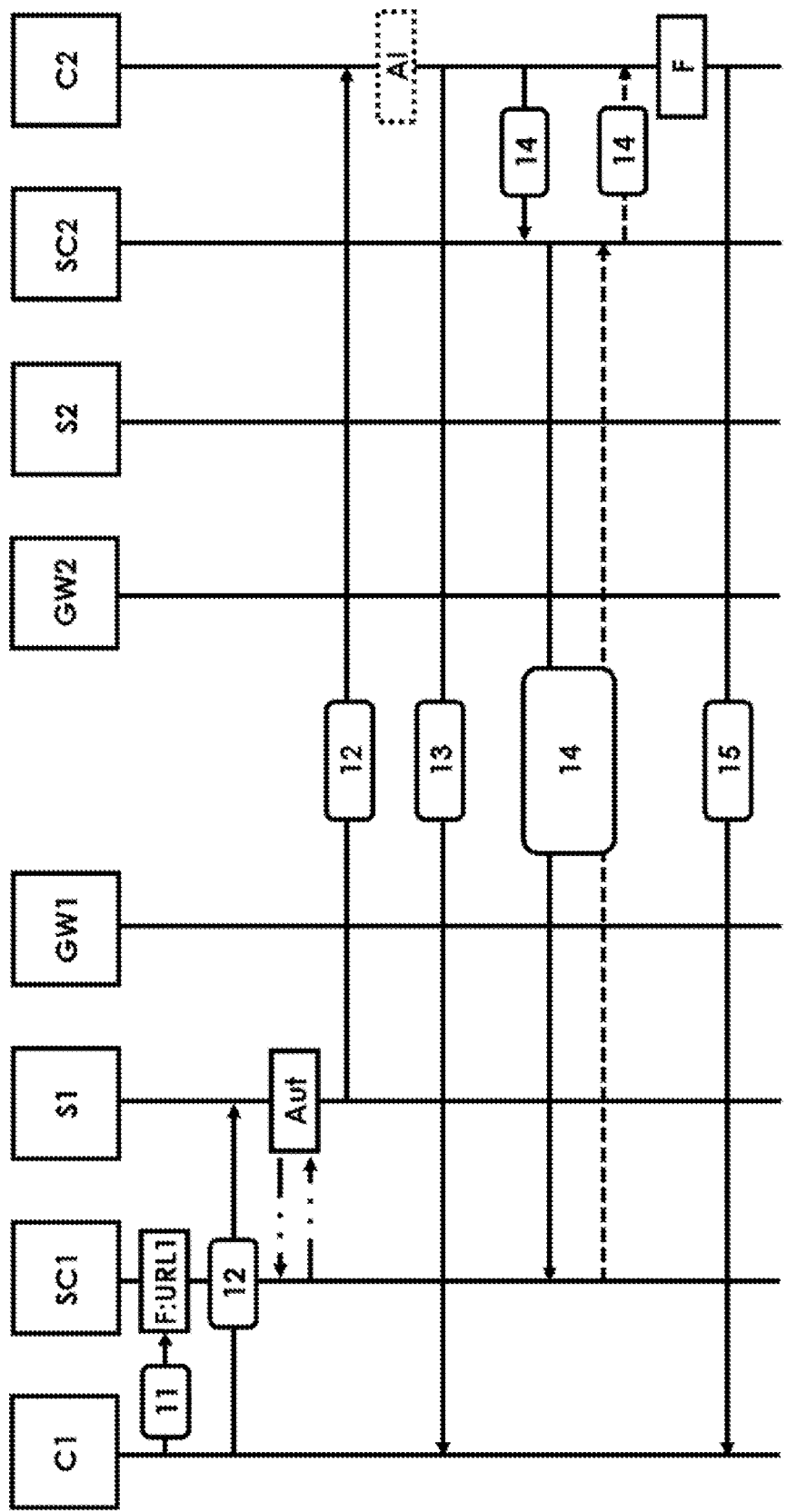
FIG. 2 shows a schematic representation of exchanges of a known file distribution method within interconnected systems in the 3GPP MCS standard.
Figure 3:
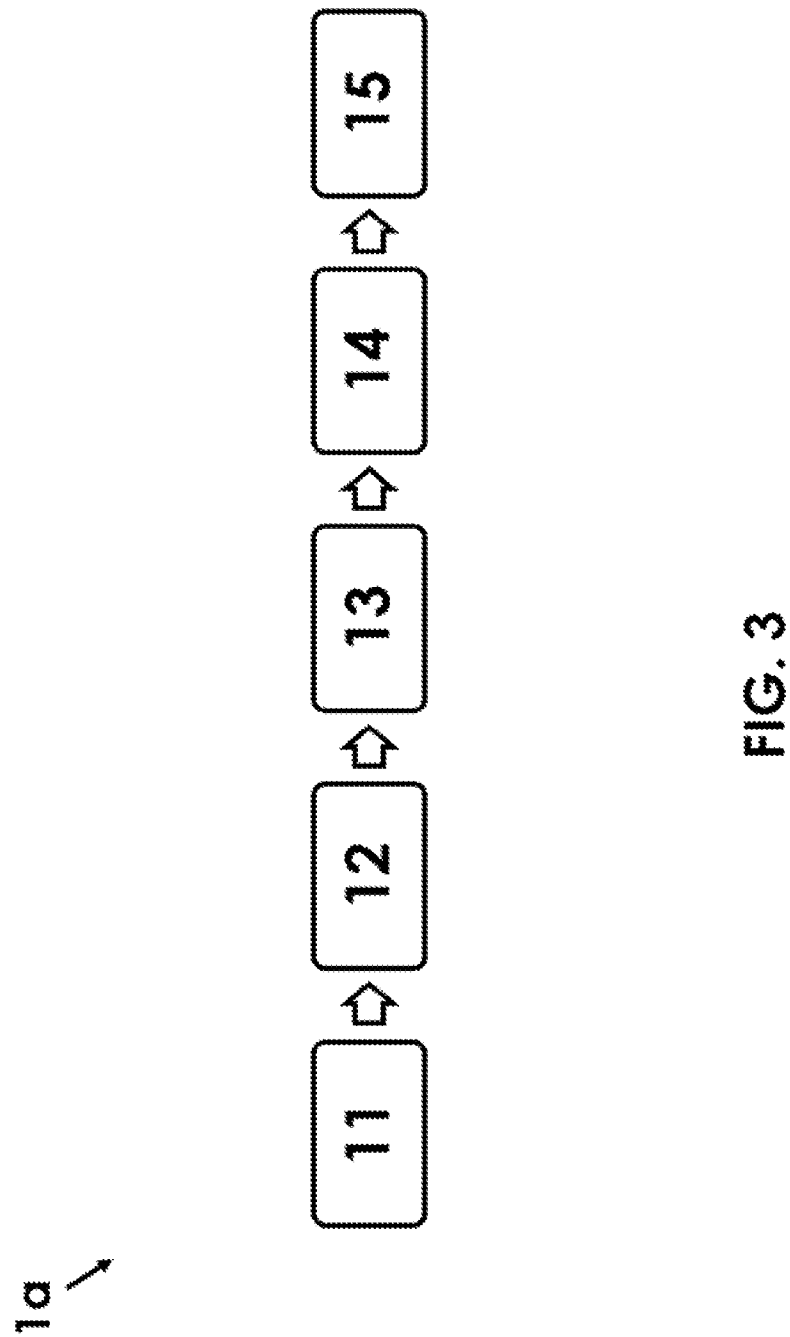
FIG. 3 shows a schematic representation of a known file distribution method within interconnected systems in the 3GPP MCS standard.
Figure 4:
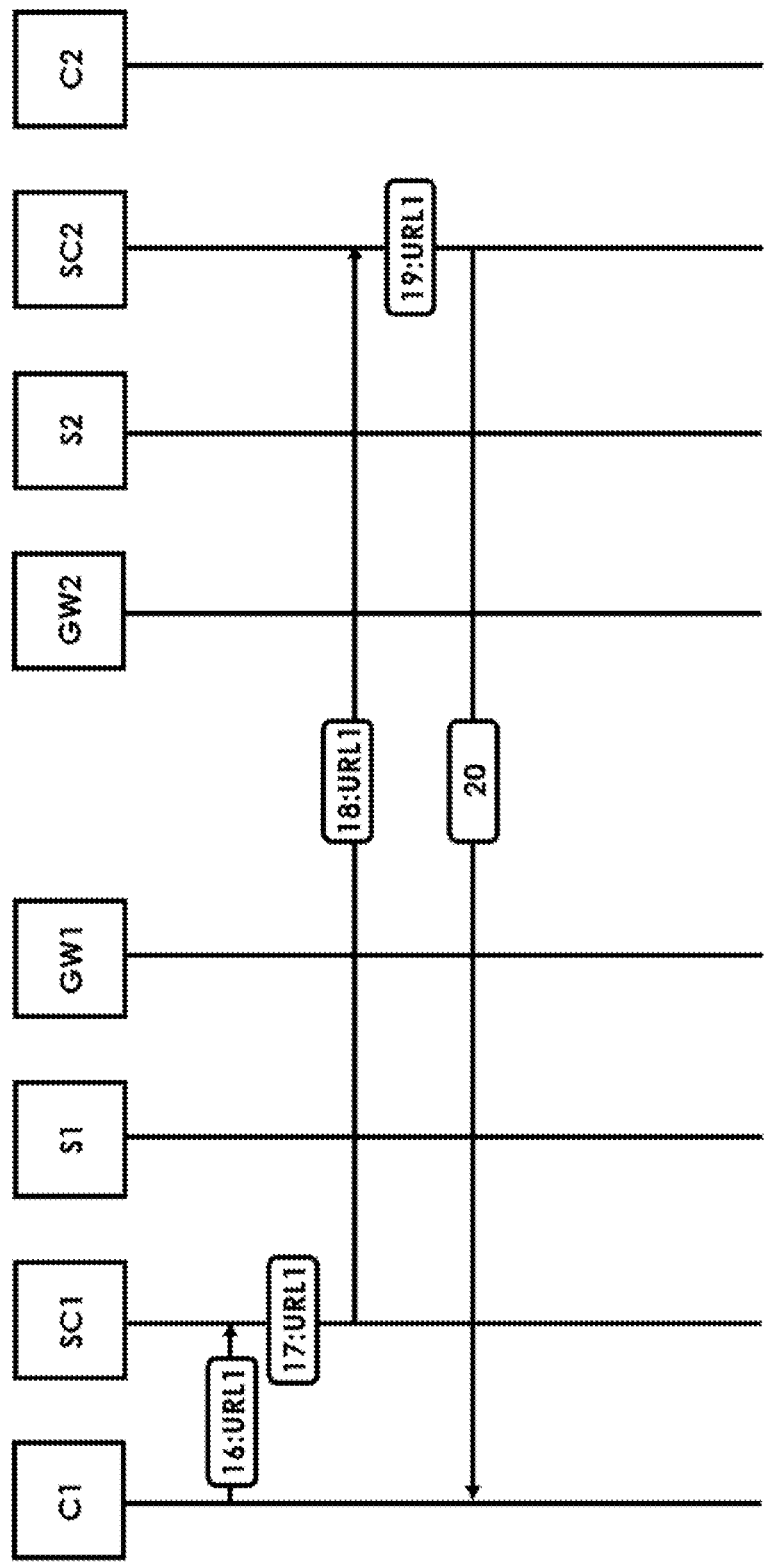
FIG. 4 shows a schematic representation of exchanges of a known file deletion method within interconnected systems in the 3GPP MCS standard.
Figure 5:
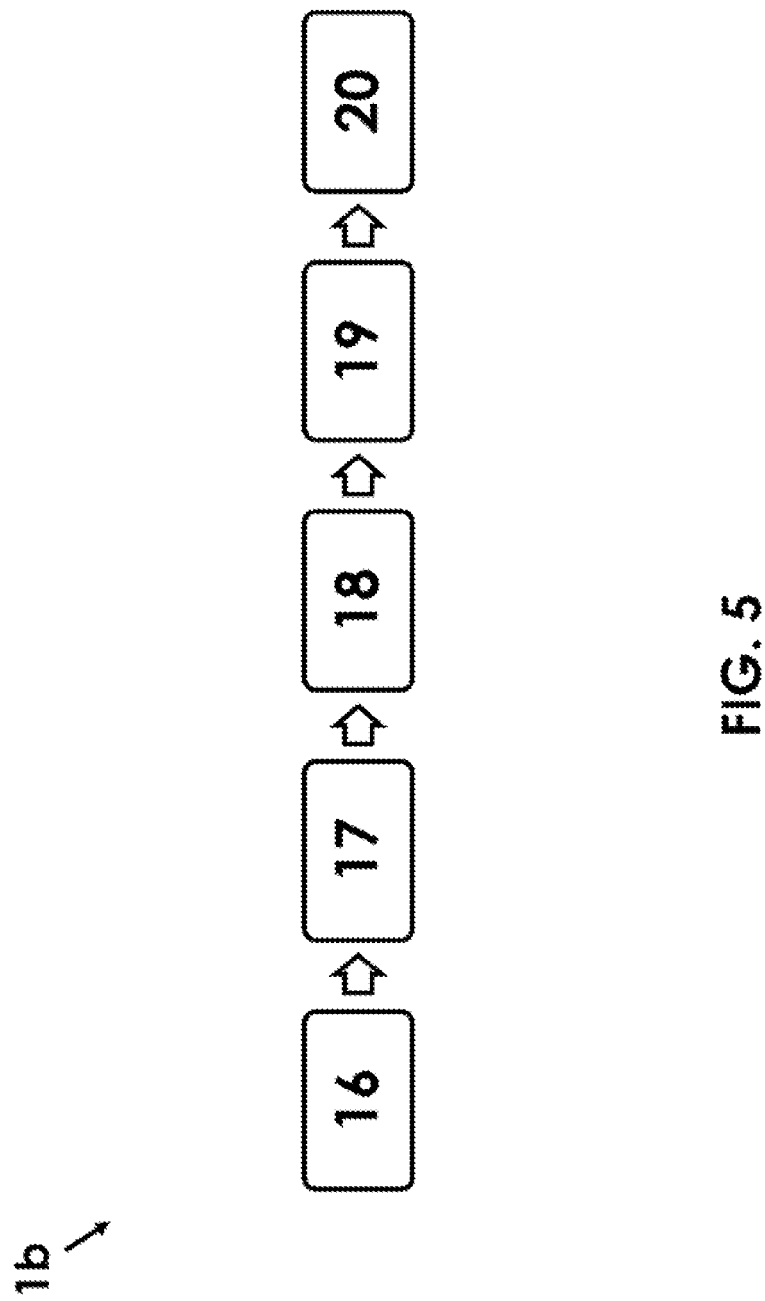
FIG. 5 shows a schematic representation of a known file deletion method within interconnected systems in the 3GPP MCS standard.

The network R represented in FIG. 1 implementing the methods according to the invention is a network according to the 3GPP MCS standard, that is it is implemented according to specifications defined by the 3GPP MCS standard.

This network R is formed by the first system A and the second system B. The systems A and B are interconnected, that is they are linked through gateways, a first gateway GW1 belonging to the first system A and a second gateway GW2 belonging to the second system B. The invention is not limited to these two interconnected systems, and covers any network comprising a plurality of interconnected systems. The two gateways communicate with each other according to any known exchange protocol, for example via exchanges according to the HTTP protocol.

The first system A comprises a first client entity C1, a first content server SC1, a first management server S1 and the first gateway GW1. The second system B comprises a second client entity C2, the second content server SC2, the second management server S2 and the second gateway GW2. The gateways GW1 and GW2 may be implemented by servers.

A client entity is a device, for example a user equipment (UE) comprising at least one memory and at least one processor, the memory comprising instructions which, when executed by the processor, cause the user equipment to implement the actions assigned to it in the following description. In an embodiment, the client entities comprise a display device, in order to display the distributed file F, for example comprising text, a photo, or any other file. In the same way, the different servers, including content servers, file distribution management servers, and optionally gateways are devices comprising at least one memory and at least one processor, the memory comprising instructions which, when executed by the processor, cause the server to implement the actions assigned to it in the remainder of the description. The servers and client entities are interconnected and form the network R as represented in FIG. 1, the network implementing wired, or wireless communications, or any combination thereof.

A content server is an MCData server for storing files F, as defined by the 3GPP MCS standard as "MCData content server". A file distribution management server is any server according to the 3GPP MCS standard implementing an FD file distribution function. The content server and the file distribution management server, hereinafter also referred to as "management server" for simplicity, may be one and the same, that is co-located in the same physical server, and implemented by a server comprising an FD file distribution function and a file storage function.

The file distribution method according to an aspect of the invention and the file deletion method according to an aspect of the invention can be implemented for any MCData FD (for "File Distribution") communication, "on-network", that is using an LTE (for "Long Term Evolution") network infrastructure and "off-network", that is without using an LTE network infrastructure:
one to one file distribution using the HTTP protocol,
one to one file distribution using the MCData service media plane of the 3GPP MCS standard,
group standalone file distribution using HTTP,
group standalone file distribution using the MCData service media plane of the 3GPP MCS standard.

Indeed, the file distribution method provided according to an aspect of the invention, although set forth in communication between two client entities, is also applicable in the case of a group MCData communication involving one or several interconnected MCData systems. In the same way, the file deletion method according to an aspect of the invention, although set forth in communication between two client entities, is also applicable in the case of an MCData group communication involving one or several interconnected MCData systems.

The file distribution method according to an aspect of the invention may be implemented in two embodiments. In a first embodiment, called "PUSH" mode, the file F is first sent to the second content server SC2 on the initiative of the first gateway GW1, and then the second client entity C2 requests access to the file F directly from the second content server SC2. In a second embodiment, called "PULL" mode, the file F is sent to the second system only in response to the demand from the second client entity C2. In the same way, the file deletion method according to an aspect of the invention is implemented according to the first «PUSH» embodiment when the distribution method is implemented according to the first «PUSH» embodiment and the file deletion method according to the invention is implemented according to the second «PULL» embodiment when the distribution method is implemented according to the second «PULL» embodiment.

First Embodiment: "PUSH" Mode

The file distribution method according to a first embodiment of the invention, referred to as "PUSH", will now be described. The method 2 according to the first embodiment of the invention is represented in FIGS. 6 and 7.

FIG. 6 represents exchanges between the different entities involved in the file distribution method 2, and FIG. 7 represents the file distribution method 2.

The file distribution method 2 comprises steps 11 to 15 of the file distribution method 1a of prior art, some of which take account of a different file address than in prior art, and comprises additional steps.

The file distribution method 2 comprises the first step 11 of uploading the file F to the first content server SC1, as described in 3GPP TS 23.282 technical specification (MCData Stage 2) Revision 17 Section 7.5.2.2. This first step may be optional, as the file F may already be on the first content server SC1.

The file distribution method 2 comprises the second step 12 divided into a first part 12A and a second part 12B. The first part 12A comprises transmitting a file distribution request F from the first client entity C1 to the first gateway GW1 via the first content server SC1 and the first management server S1. The file distribution request includes a first URL1 address. The URL1 address is, for example, of type URL (for "Uniform Resource Locator") type and is associated with the file F in the first system A, that is it indicates where the file F is stored in the first system A. As in prior art, the first management server S1 optionally performs a step Aut of authorising the request and verifying availability of the file F at the first URL1 address included in the request. The request is then transmitted to the first gateway GW1 by the first management server S1.

The first gateway GW1 then implements a step 21 of modifying, by the first gateway GW1, in the file distribution request, the first URL1 address associated with the file F in the first system A, to a second URLG1 address associated with the file F in the first system A. The second URLG1 address is specific to the first gateway GW1, that is it designates a storage location of the first gateway GW1 and/or a path to the first gateway GW1. At the same time, the first gateway GW1 stores a correspondence between the first URL1 address and the second URLG1 address.

Throughout the application, a "correspondence between two addresses" is at least one piece of data that allows an entity to relate both addresses. This may be achieved by storing both addresses in a database in a same row or a same column, or by adding an indicator to each address in the database to relate both addresses, an indicator being Boolean, text, or any other type of data. Throughout the application, an entity "stores" a piece of data such as a correspondence or a file by recording the piece of data on a physical medium that it comprises or has access to. This data or file may for example be accessed via a database.

The first gateway GW1 also implements a step 22 of retrieving the file F. Indeed, in the first "PUSH" embodiment, the file F is sent to the second content server SC2 of the second system B at the same time as a request, during the process of establishing the different addresses. This step 22, included in the file distribution method 2, is implemented for example by the first gateway GW1 sending to the first content server SC1 a file retrieve request F including the first URL1 address of the file F within the first system A. This request may be of the type "MCData file retrieve request" as defined by the 3GPP MCS standard. In response to this request, the first content server SC1 transmits, to the first gateway GW1, the file F, which is then stored by the first gateway GW1 at the second URLG1 address.

The file F is then transmitted, in a step 23, by the first gateway GW1 to the second content server SC2. This may be achieved by transmitting the file F with an "MCData FD Upload data request" as defined by the 3GPP MCS standard. This step 23 is performed by transmitting the request from the first gateway GW1 to the second gateway GW2 and then from the second gateway GW2 to the second management server S2, and then from the second management server S2 to the second content server SC2. During this transmission 23, the second management server S2 creates a third URL2 address associated with the file F in the second system B and creates and stores a correspondence between the second URLG1 address and a third URL2 address. The third URL2 address is specific to the second content server SC2, that is it designates a storage location of the second content server SC2 and/or a path to the file F stored on the second content server SC2.

The file F is then stored by the second content server SC2, as represented by the rectangle labelled "F:URL2" in FIG. 6.

The file distribution method 2 then includes a step 24 of transmitting, from the second content server SC2 to the first gateway GW1, a response indicating that the file F has actually been stored by the second content server SC2. This response is first transmitted to the second gateway GW2, which then creates a fourth URLG2 address.

The second gateway GW2 also stores a correspondence between the third URL2 address and the fourth URLG2 address. Thus, any system external to the second system B can access the file F stored by the second content server SC2 at the third URL2 address without security risk to the second system B. For example, the first system A can access the file F stored by the second content server SC2 using the fourth URLG2 address. Another system not represented may also access the file F stored by the second content server SC2 at the third URL2 address using the fourth URLG2 address. The second gateway GW2 receiving a request including the fourth URLG2 address will then perform conversion of the fourth URLG2 address to the third URL2 address.

The second gateway GW2 transmits the response indicating that the file F has actually been stored by the second content server SC2 to the first gateway GW1. This response includes the fourth URLG2, the third URL2 address included in the response having been modified by the second gateway GW2 to the fourth URLG2 address. The first gateway GW1 then stores information of storage of file F by the second system B at the fourth URLG2 address.

As in prior art, the first gateway GW1 then transmits a file distribution request in a second part of step 12 called 12B to the second client entity C2. Thus, the file distribution method 2 is transparent to the second client entity C2 and appears, to the second client entity C2, identical to the method of prior art. What differs from prior art in the second part 12B of step 12 is that the address of the file F included in the file distribution request is the address of the file F in the second system B. The file distribution request transmitted by the first gateway GW1 includes the fourth URLG2 address because this is the address that the first gateway GW1 knows for the file F in the second system B and because the file distribution request informs the second system B of the availability and location of the file F.

The second gateway GW2, receiving this request, performs conversion of the fourth URLG2 address into the third URL2 address from the correspondence between the fourth URLG2 address and the third URL2 address that it stores, and then transmits the file distribution request to the second client entity C2 via the second management server S2 and the second content server SC2.

The second client entity C2 then optionally issues an alert AI, informing a user of the second client entity C2 that the file F is available, as in prior art, for example on a screen of the second client entity C2.

The second client entity C2 then performs a response step 13 to the first client entity C1, the response comprising an acceptance or a refusal of access to the file F by the second client entity C2. This step 13 is identical to the response step 13 of the state of the art.

The second client entity C2 then performs a step 14 of transmitting a request to download the file F to the second content server SC2. This request is the same "MCData download data request" as defined by the 3GPP MCS standard as the request in step 14 of the state of the art. The difference with prior art is that the file F download request includes the third URL2 address, instead of an address constructed from, and containing entirely the first URL1 address.

In contrast to the state of the art, the second content server SC2 can directly process the file F download request because the second content server SC2 stores the file F at the third URL2 address included in the file F download request transmitted by the second client entity C2. The second content server SC2 then directly sends the file F that it stores to the third URL2 address. Thus, exchanges between interconnected systems are limited, limiting security risks. The second client entity C2 has no knowledge of the second URLG1 address or the first URL1 address, and the second client entity C2 and its user therefore have no information about the first system A interconnected with the second system B.

In step 14, the second client entity C2 then receives the file F. The file distribution method 2 may comprise a further step 15 in which the second client entity C2 provides a download report to the first client entity C1.

The file distribution method 2 according to a first "PUSH" embodiment of the invention thus allows limiting security risks while being transparent to the first client entity C1 and second client entity C2. Furthermore, the file distribution method 2 allows the file to be distributed to an external system interconnected to the system that originally stores the file F, and allows the same addressing security to be set up in the interconnected external system for access to the file stored in the interconnected external system after it has been distributed. Thus, both interconnected systems are not subject to the security risk of the state of the art.

Figure 10:
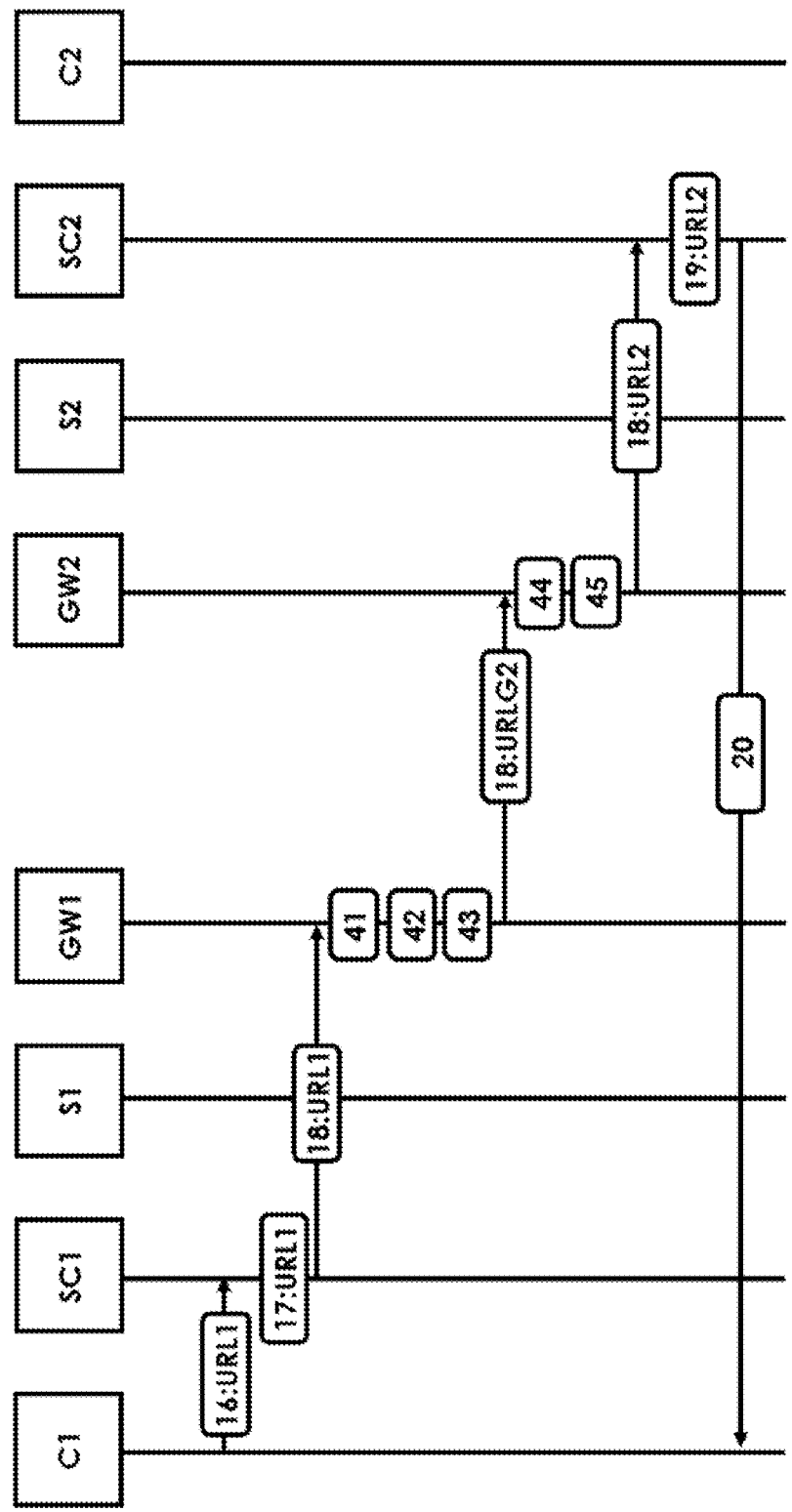
FIG. 10 shows a schematic representation of a file deletion method according to a first embodiment of the invention within interconnected systems in the 3GPP MCS standard.

FIG. 10 shows a schematic representation of a file F deletion method, wherein the file F has been distributed according to the file distribution method 2 in the first «PUSH» embodiment according to the invention.

In a first step 16, the first client entity C1 wishes to delete the file F included in the first content server SC1 and in any content server of other interconnected systems which would store this file F following the implementation of the file distribution method 2 in the first "PUSH" embodiment. The first client entity C1 thus sends a file F delete request comprising the only address of the file it knows, that is the first URL1 address. This request is received by the content server SC1, which then deletes the file F located at the first URL1 address, in a step 17.

This deletion request is transmitted by the content server SC1 to the first gateway GW1, which then performs, in a step 41, conversion of the first URL1 address into the second URLG1 address, from the correspondence between the first URL1 address and the second URLG1 address stored by the first gateway GW1. This correspondence stored by the first gateway GW1 is then deleted, in step 42, by the first gateway GW1.

The first gateway GW1 then modifies, in the file F deletion request, the first URL1 address to the fourth URLG2 address. This modification is performed from:
  the conversion step, which transformed the first URL1 address into the second URLG1 address,
  the information of storage of the file F by the second content server SC2 at the fourth URLG2 address, allowing the first gateway GW1 to know that file F is stored by the second content server SC2,
  and the correspondence between the fourth URLG2 address and the second URLG1 address stored by the first gateway GW1, because the first gateway GW1 knows that the file F to be deleted is in the second system B and that the second system B comprises the second gateway GW2 at the fourth URLG2 address.

The request to delete file F is then transmitted to each interconnected system storing the file F of which the first gateway GW1 has the knowledge, that is in this example the second system B. The request is thus transmitted to the second gateway GW2 in a step 18, the request to delete file F including the fourth URLG2 address.

The second gateway GW2, upon receiving this request, modifies, in step 44, in the request, the fourth URLG2 address into the third URL2 address from the correspondence between the fourth URLG2 address and the third URL2 address that it stores. This correspondence is then deleted by the second gateway GW2 in step 45.

The second gateway GW2 transmits the file F deletion request to the second content server SC2 via the second management server S2, that is the file F deletion request is transmitted to the second management server S2 which in turn transmits it to the second content server SC2.

Upon receiving this request, the second management server S2 deletes the correspondence between the second URLG1 address and the third URL2 address that it stores (not represented).

Upon receiving this request, in a step 19, the second content server SC2 deletes the file F that it stores.

The deletion method according to the first "PUSH" embodiment may include an alert AI to the user of the second client entity C2 to inform them that the file F has been deleted. Optionally, information that the deletion is performed is then sent by the content server SC2 to the content server SC1 and then to C1 at a step 20.

By virtue of the deletion method according to the first "PUSH" embodiment, all correspondences stored by entities of the network R dealing with addresses related to the file F are deleted. In the same way, the file F is deleted from the first system A and any copies of file F on any systems within the network R are deleted. The deletion request never makes the address of the file in one system appear to another interconnected system, thus solving the security problems of prior art.

Second Embodiment: "PULL" Mode

The file distribution method according to a second embodiment of the invention referred to as "PULL" will now be described. The method 3 according to the second embodiment of the invention is represented in FIGS. 8 and 9.

FIG. 8 represents exchanges between the different entities involved in the file distribution method 3, and FIG. 9 represents the file distribution method 3.

The file distribution method 3 comprises steps 11 to 15 of the file distribution method 1a of prior art, some of which take account of a different file address than in prior art, and comprises additional steps.

The file distribution method 3 comprises the first step 11 of uploading the file F to the first content server SC1, as described in 3GPP TS 23.282 technical specification (MC-Data Stage 2) Revision 17 Section 7.5.2.2. This first step may be optional, as the file F may already be on the first content server SC1.

The file distribution method 2 comprises the second step 12 divided into a first part 12A and a second part 12B. The first part 12A comprises transmitting a file distribution request F from the first client entity C1 to the first gateway GW1 via the first content server SC1 and the first management server S1. The file distribution request includes a first URL1 address. The URL1 address is, for example, of the URL (for "Uniform Resource Locator") type and is associated with the file F in the first system A, that is it indicates where the file F is stored in the first system A. As in prior art, the first management server S1 optionally performs a step Aut of authorising the request and verifying availability of the file F at the first URL1 address included in the request. The request is then transmitted to the first gateway GW1 by the first management server S1.

The first gateway GW1 then implements a step 31 of modifying, by the first gateway GW1, in the file distribution request, the first URL1 address associated with the file F in the first system A, into a second URLG1 address associated with the file F in the first system A. The second URLG1 address is specific to the first gateway GW1, that is it designates a storage location of the first gateway GW1 and/or a path to the first gateway GW1. At the same time, the first gateway GW1 stores a correspondence between the first URL1 address and the second URLG1 address.

In the second "PULL" embodiment, unlike the first "PUSH" embodiment, the first gateway GW1 does not retrieve the file F at this stage of the method. In one alternative to the second "PULL" embodiment, the first gateway GW1 may request from the first content server SC1 access to the file F and temporarily store the file F waiting for a download request from a client entity of a system interconnected with the first system A.

As in prior art, the first gateway GW1 then transmits a file distribution request in a second part of step 12 called 12B to the second client entity C2. Thus, the file distribution method 2 is transparent to the second client entity C2 and appears, to the second client entity C2, identical to the method of prior art. What differs from prior art in the second part 12B of step 12 is that the address of the file F included in the file distribution request is the address of the first gateway GW1, because the file distribution request informs the second system B of the availability and location of the file F, and because the first URL1 address has been hidden by the first gateway GW1.

The second gateway GW2, receiving this request, transmits it to the second client entity C2 via the second management server S2 and the second content server SC2.

The second management server S2 receiving this request creates a third URL2 address associated with the file F in the second system B in step 32 and creates and stores a correspondence between the second URLG1 address and a third URL2 address. The third URL2 address is specific to the second content server SC2, that is it designates a storage location of the second content server SC2 and/or a path to the second content server SC2. The second management server S2 changes the second URLG1 address to the third URL2 address in the file distribution request F and transmits it to the second client entity C2.

The second client entity C2, receiving this request comprising the third URL2 address then optionally issues an alert AI, informing a user of the second client entity C2 that the file F is available, as in prior art, for example on a screen of the second client entity C2.

The second client entity C2 then performs a response step 13 to the first client entity C1, the response comprising an acceptance or a refusal of access to the file F by the second client entity C2. This step 13 is identical to the response step 13 of the state of the art.

The second client entity C2 then performs a step 14 of transmitting a request to download the file F to the second content server SC2. This request is the same "MCData download data request" as defined by the 3GPP MCS standard as the request in step 14 of the state of the art. The difference with the state of the art is that the request to download file F comprises the third URL2 address, instead of the first URL1 address.

In contrast to the first «PUSH» embodiment, in the second «PULL» embodiment the second content server SC2 does not store the file F at the third URL2 address, and therefore transmits the request to the first system A. Before doing so, the second content server SC2 changes the third URL2 address to the second URLG1 address in the request, due to the correspondence between the third URL2 address and the second URLG1 address stored by the second management server S2.

The request is transmitted from the second content server SC2 to the first content server SC1 via the second management server S2, via the second gateway GW2, via the first gateway GW1 and via the first management server S1.

The first gateway GW1 receiving this request modifies the second URLG1 address to the first URL1 address due to the correspondence between the second URLG1 address and the first URL1 address that it stores. The first gateway GW1 then transmits this request to the first content server SC1, which stores the file F.

The first content server SC1 storing this file F accesses it by following the first URL1 address.

The first content server SC1 transmits the file F to the second client entity C2. For this, the file F is sent with a response to the request to download the file F.

The file F is transmitted via the first gateway GW1, which may temporarily store the file F. The second URLG1 address is thereby the address for accessing the file F by an external system interconnected with the first system A.

Still in step 14, the second client entity C2 then receives the file F, which transited through the second gateway GW2 and the second content server SC2. The file distribution method 3 may comprise a further step 15 in which the second client entity C2 provides a download report to the first client entity C1.

The file distribution method 3 according to a second "PULL" embodiment of the invention thus allows limiting security risks while being transparent to the first client entity C1 and second client entity C2. Moreover, the file distribution method 3 allows the file F to be kept only on servers within the first system A, in contrast to the first "PUSH" embodiment.

Figure 11:
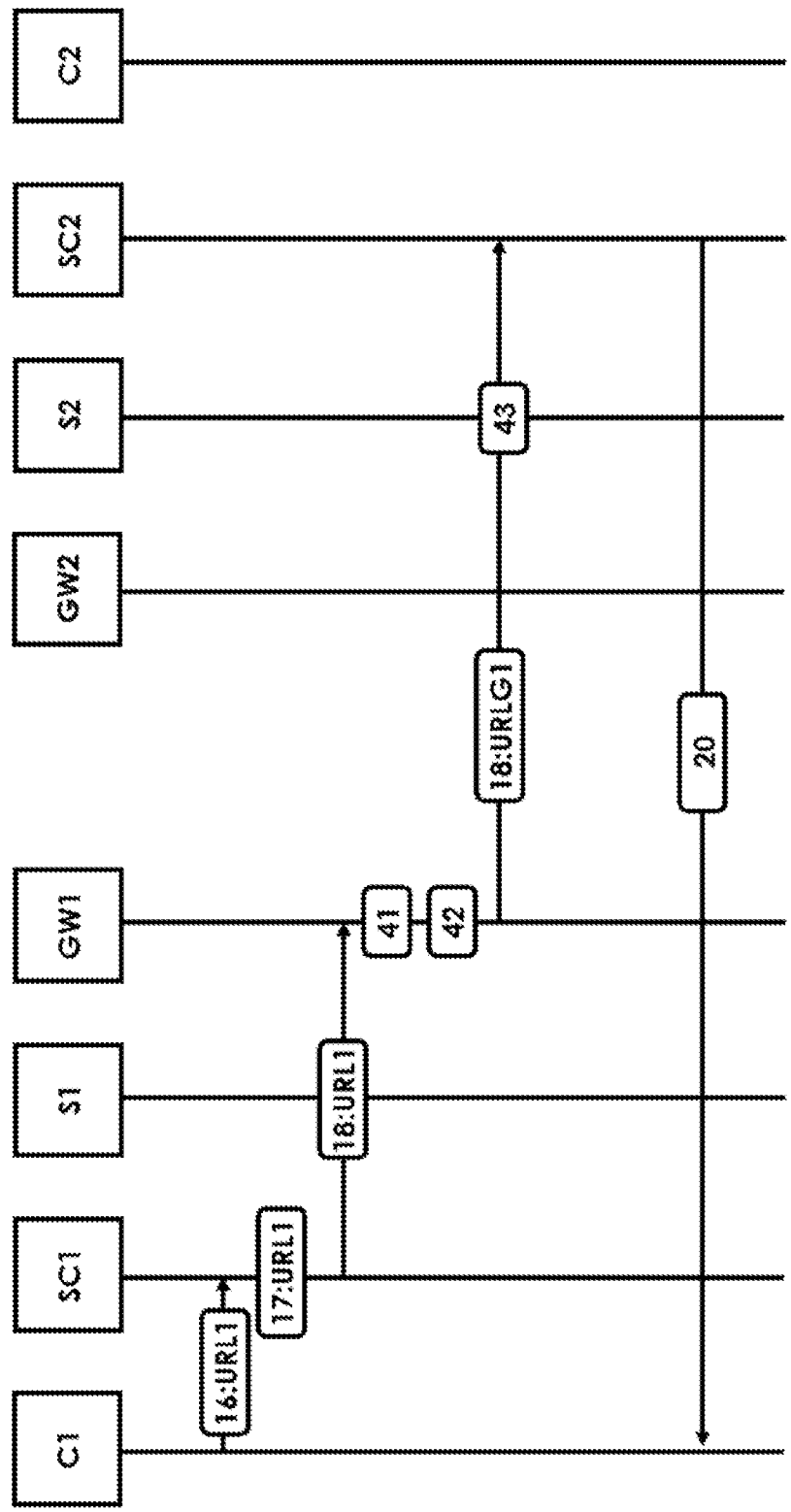
FIG. 11 shows a schematic representation of a file deletion method according to a second embodiment of the invention within interconnected systems in the 3GPP MCS standard.

FIG. 11 shows a schematic representation of a file F deletion method, wherein the file F has been distributed according to the file distribution method 3 in the second "PULL" embodiment according to the invention.

In a first step 16, the first client entity C1 wishes to delete the file F included in the first content server SC1 and the correspondences of addresses stored in any server of other interconnected systems following the implementation of the file distribution method 3 in the second "PULL" embodiment. The first client entity C1 therefore sends a request to delete file F comprising the only address of file F that it knows, that is the first URL1 address. This request is received by the content server SC1, which then deletes the file F located at the first URL1 address, in a step 17.

This deletion request is transmitted by the content server SC1 to the first gateway GW1, which then performs, in a step 41, conversion of the first URL1 address into the second URLG1 address, from the correspondence between the first URL1 address and the second URLG1 address stored by the first gateway GW1. This correspondence stored by the first gateway GW1 is then deleted, in step 42, by the first gateway GW1.

The first gateway GW1 then modifies, in the file F deletion request, the first URL1 address to the second URLG1 address. This change is made from the conversion step, which transformed the first URL1 address into the second URLG1 address.

The request to delete the file F is then transmitted to each interconnected system that implemented the method 3 of which the first gateway GW1 has the knowledge, that is in this example the second system B. The request is thus transmitted to the second gateway GW2 in a step 18, the request to delete file F comprising the second URLG1 address.

The second gateway GW2, upon receiving this request, transmits the request to delete file F to the second content server SC2 via the second management server S2, that is the request to delete file F is transmitted to the second management server S2 which in turn transmits it to the second content server SC2.

Upon receiving this request, in a step 43, the second management server S2 deletes the correspondence between the second URLG1 address and the third URL2 address that it stores.

The deletion method according to the second "PULL" embodiment may include an alert AI to the user of the second client entity C2 to inform them that the file F has been deleted. Optionally, information that the deletion is performed is then sent by the content server SC2 to the content server SC1 and then to C1 in a step 20.

Due to the deletion method according to the second "PULL" embodiment, all correspondences stored by entities of the network R dealing with addresses related to file F are deleted. In the same way, the file F is deleted from the first system A and any copy of the file F on any system in the network R is deleted. The deletion request never makes the address of the file in one system appear to another interconnected system, thus solving security problems of prior art.

It will be appreciated that the various embodiments described previously are combinable according to any technically permissible combinations.

The articles "a" and "an" may be employed in connection with various elements and components of processes or structures described herein. This is merely for convenience and to give a general sense of the processes or structures. Such a description includes "one or at least one" of the elements or components. Moreover, as used herein, the singular articles also include a description of a plurality of elements or components, unless it is apparent from a specific context that the plural is excluded.

The invention claimed is:

1. A method for distributing a file, by a first client entity, to at least one second client entity in a communication network according to the 3GPP MCS (3rd Generation Partnership Program Mission-Critical System) standard, the first client entity being included in a first system further comprising a first content server and a first file distribution management server, the second client entity being included in a second system further comprising a second content server and a second file distribution management server, the first system and the second system being interconnected through a first gateway included in the first system and through a second gateway included in the second system, the file being stored by the first content server and being associated with a first address in the first system, the network being formed by at least the first system and the second system, the method comprising:

transmitting, by the first client entity to the first gateway, a file distribution request comprising the first address associated with the file in the first system, modifying, by the first gateway, in the file distribution request, the first address associated with the file in the first system, to a second address associated with the file in the first system, storing, by the first gateway, a correspondence between the first address and the second address, transmitting, by the first gateway to the second content server via the second gateway and the second file distribution management server, the file distribution request comprising the second address associated with the file in the first system, modifying, by the second file distribution management server, in the file distribution request, the second address associated with the file in the first system, to a third address associated with the file in the second system, storing, by the second file distribution management server, a correspondence between the second address and the third address, transmitting, by the second content server, the file distribution request including the third address to the second client entity, transmitting, by the second client entity, a request to download the file to the second content server, the request comprising the third address, and receiving, by the second client entity, the file.

2. The method according to claim 1, wherein the file is sent from the second content server to the client entity in response to the request to download the file.

3. The method according to claim 2, wherein the file is transmitted by the first content server to the second content server and the file is stored by the second content server prior to transmitting, by the second client entity, the request to download the file.

4. The method according to claim 2, wherein, after receiving the request to distribute the file and the file, the second content server transmits to the first gateway, via the second gateway, a response indicating that the file has been stored by the second content server, the response comprising the third address.

5. The method according to claim 4, wherein the second gateway, upon receiving the response:
creates a fourth address associated with the file stored by the second content server in the second system,
modifies the third address included in the response to the fourth address created,
stores a correspondence between the third address and the fourth address,
transmits the response including the fourth address to the first gateway, and wherein the first gateway stores a correspondence between the second address and the fourth address and file storage information by the second content server at the fourth address.

6. The method according to claim 1, wherein:
the request to download the file is transmitted, by the second client entity to the second content server, and then
the third address included in the download request is transformed into the second address from the correspondence between the second address and the third address stored by the second management server, and then
the request is transmitted by the second content server to the first gateway via the second gateway, and then
the second address included in the download request is transformed into the first address from the correspondence between the first address and the second address stored by the first gateway, and then
the request is transmitted by the first gateway to the first content server, and then
the file is transmitted from the first content server to the second content server.

7. A method for deleting the file distributed according to the file distribution method according to claim 5, comprising:

transmitting, by the first client entity, a request to delete the file to the first content server, the request including the first address associated with the file within the first system, deleting, by the first content server, the file that it stores, transmitting, by the first content server, the request to delete the file to the first gateway, converting, by the first gateway, the first address associated with the file in the first system, into the second address associated with the file in the first system, from the correspondence between the first address and the second address stored by the first gateway, deleting, by the first gateway, the correspondence between the first address and the second address stored by the first gateway, modifying, by the first gateway, in the request to delete the file, the first address associated with the file in the first system to the fourth address associated with the file in the second system, from the storage information of the file by the second content server at the fourth address, from the conversion step and from the correspondence between the second address and the fourth address stored by the first gateway, transmitting, by the first gateway, the request to delete the file to the second gateway, modifying, by the second gateway, in the file deletion request, the fourth address to the third address, from the correspondence between the fourth address and the third address stored by the second gateway, deleting, by the second gateway, the correspondence between the fourth address and the third address stored by the second gateway, transmitting, by the second gateway, the request to delete the file to the second content server via the second management server, and deleting, by the second management server, the correspondence between the second address and the third address stored by the second management server.

8. The file deletion method according to claim 7, further comprising deleting, by the second content server, the file that it stores.

9. A method for deleting the file distributed according to the file distribution method according to claim 6, comprising:

transmitting, by the first client entity, a request to delete the file to the first content server, the request including the first address associated with the file within the first system, deleting, by the first content server, the file that it stores, transmitting, by the first content server, the request to delete the file to the first gateway, converting, by the first gateway,
deleting, by the first gateway, the correspondence between the first address and the second address stored by the first gateway,
modifying, by the first gateway, in the request to delete the file, the first address associated with the file in the first system, to the second address associated with the file in the first system, from the correspondence between the first address and the second address stored by the first gateway,
transmitting, by the first gateway to the second content server, the request to delete the file via the second gateway and the second management server, and
deleting, by the second management server, the correspondence between the second address and the third address stored by the second management server.

10. A communication network according to the 3GPP MCS (3rd Generation Partnership Program Mission-Critical System) standard, the communication network comprising:
- a first system comprising at least a first client entity, a first content server and a first file distribution management server,
- a second system comprising at least a second client entity, a second content server and a second file distribution management server,
- the first system and the second system being interconnected through a first gateway included in the first system and through a second gateway included in the second system, the communication network being configured to implement the file distribution method according to claim 1.

11. A non-transitory computer-readable medium, comprising machine readable instructions for carrying out the method according to claim 1.

12. A non-transitory computer-readable medium, comprising machine readable instructions for carrying out the method according to claim 7.

\* \* \* \* \*